(12) United States Patent
Mabuchi et al.

(10) Patent No.: US 6,919,401 B2
(45) Date of Patent: Jul. 19, 2005

(54) ELASTOMER COMPOSITION AND RUBBER ROLLER COMPOSED THEREOF

(75) Inventors: Takahiro Mabuchi, Hyogo (JP); Yasuchika Ito, Hyogo (JP); Tetsuo Mizoguchi, Hyogo (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 10/690,501

(22) Filed: Oct. 23, 2003

(65) Prior Publication Data

US 2004/0082725 A1 Apr. 29, 2004

(30) Foreign Application Priority Data

Oct. 24, 2002 (JP) ......................................... 2002-309390

(51) Int. Cl.[7] ................................................. C08F 32/00
(52) U.S. Cl. ..................... 524/500; 524/543; 525/326.1
(58) Field of Search ....................... 525/326.1; 524/500, 524/543

(56) References Cited

FOREIGN PATENT DOCUMENTS

| JP | 8-334939 A | | 12/1996 |
|----|------------|---|---------|
| JP | 08334939 | * | 12/1996 |
| JP | 2000-248133 A | | 9/2000 |
| JP | 2000-248133 | * | 9/2000 |

* cited by examiner

Primary Examiner—William K. Cheung
(74) Attorney, Agent, or Firm—Birch, Stewart, Kolasch & Birch LLP

(57) ABSTRACT

A rubber roller formed by molding an elastomer composition not less than 250 $\mu$s nor more than 400 $\mu$s in a T2 relaxation time (spin-spin relaxation) of a bound rubber formed between a rubber and/or a thermoplastic elastomer and a reinforcing filler. EPDM can be used as the rubber and/or the thermoplastic elastomer, carbon black as the reinforcing filler, and an organic peroxide as a crosslinking agent. The T2 relaxation time (spin-spin relaxation) of the bound rubber formed between the rubber and/or thermoplastic elastomer and the reinforcing filler is more than a T2 relaxation time of a bound rubber of the rubber and/or thermoplastic elastomer to which the reinforcing filler is not added by not less than 150% nor more than 300%.

15 Claims, 2 Drawing Sheets

ELASTOMER COMPOSITION AND RUBBER ROLLER COMPOSED THEREOF

This Nonprovisional application claims priority under 35 U.S.C. § 119(a) on Patent Application No(s). 2002-309390 filed in Japan on Oct. 24, 2002, the entire contents of which are hereby incorporated by reference.

BACKGROUND OF THE INVENTION

1. Field of the Invention

The present invention relates to an elastomer composition and a rubber roller composed of the elastomer composition. More particularly, the present invention relates to the elastomeric composition that can be preferably used as a rubber roller in a paper-feeding mechanism of an ink jet printer, a laser printer, an electrostatic copying apparatus, a facsimile apparatus, an automatic deposit payment machine (ATM), and the like, to feed objects such as sheets of paper or films by picking up the objects one by one, separately, from the objects piled up one upon the other. Therefore, the present invention is intended to provide the rubber roller with a high friction coefficient and a high wear resistance.

2. Description of the Related Art

A paper-feeding roller formed by molding a rubber composition is used in the paper-feeding mechanism of electrostatic copying apparatus, laser printers, ink jet printers, facsimile apparatus; and automatic deposit payment machines (ATM). Paper-feeding rollers composed of rubber compositions have the problem that the paper supply state becomes bad due to the blooming of sulfur contained in the rubber composition.

A vulcanizing system consisting of a peroxide is known as a rubber-vulcanizing system which does not use sulfur. To suppress blooming, a paper-feeding roller using rubber vulcanized by a vulcanizing system consisting of an organic peroxide is proposed.

Disclosed in Japanese Patent Application Laid-Open No. 8-334939 is a rubber composition for a roller containing 100 parts by weight of ethylene-propylene copolymer and 3 to 6 parts by weight of vulcanizing agent containing a peroxide.

Disclosed in Japanese Patent Application Laid-Open No. 2000-248133 is a rubber composition containing ethylene-propylene-diene rubber, carbon black (not less than 25 wt % nor more than 50 wt %) in which an oil absorption amount is specified, paraffin process oil, and an organic peroxide for crosslinking the ethylene-propylene-diene rubber.

However, although blooming does not occur in the paper-feeding roller using rubber vulcanized by the vulcanizing system consisting of organic peroxide, the wear resistance of the paper-feeding roller is inferior to that of a paper-feeding roller using rubber vulcanized with sulfur.

The paper-feeding roller proposed in Japanese Patent Application Laid-Open No. 8-334939 is capable of favorably feeding not more than 200,000 sheets of paper. That is, the paper-feeding roller has a problem in its wear resistance.

The paper-feeding roller proposed in Japanese Patent Application Laid-Open No. 2000-248133 contains a large amount of carbon black to secure electric conductivity. More specifically, the paper-feeding roller contains not less than 25 wt % nor more than 50 wt % of the carbon black. The paper-feeding roller has favorable electric conductivity, but has a problem in its wear resistance because the paper-feeding roller becomes worn due to repeated contact between it and paper. Another problem of the paper-feeding roller is that the paper is stained with the carbon black. The paper-feeding roller has still another problem in that it has a high hardness due to the reinforcing effect of the carbon black and hence does not have a sufficient friction coefficient.

SUMMARY OF THE INVENTION

The present invention has been made in view of the above problems. Thus, it is an object of the present invention to provide an elastomer composition superior in its wear resistance and its ability not to stain paper and a rubber roller composed of such an elastomer composition.

To achieve this object, the present invention provides an elastomer composition containing a rubber and/or or/and a thermoplastic elastomer as a main component thereof and a reinforcing filler dispersed in the rubber and/or the thermoplastic elastomer. The T2 relaxation time (spin-spin relaxation) of the bound rubber formed due to the close proximity between the rubber and/or the thermoplastic elastomer and the reinforcing filler, including the interface therebetween, is set to be not less than 250 µs nor more than 400 µs.

The present invention has found that an elastomeric composition having a certain range in the T2 relaxation time (spin-spin relaxation) of the bound rubber formed due to the close proximity between the rubber and/or the thermoplastic elastomer and the reinforcing filler, including the interface between the rubber and/or the thermoplastic elastomer and the reinforcing filler, has superior wear resistance. Because the elastomer composition is excellent in its wear resistance, it exhibits a small amount of wear over long-time use and a high durability. Further it is possible to suppress a reduction of its friction coefficient. Also, since the elastomeric composition contains a small amount of the reinforcing filler such as the carbon black, the T2 relaxation time is set to a narrow range. Therefore the rubber roller does not stain paper. Further the reduction of the friction coefficient of the elastomeric composition can be suppressed because blooming does not occur.

The T2 relaxation time (spin-spin relaxation) of the bound rubber formed between the rubber and/or the thermoplastic elastomer and the reinforcing filler is a value obtained by measuring the elastomeric composition of the present invention in a solid echo method by using a nuclear magnetic resonator (pulse-NMR).

Immediately after the elastomeric composition is irradiated with a radio wave of NMR, arrows of nuclear spins point in the same direction. That is, the nuclear spins are in phase, namely, in a coherent state. The state of the nuclear spins change from the coherent state to a random state (arrows of nuclear spins point in different directions) because one nuclear spin feels the nonuniform swing of magnetic fields of other nuclear spins. The spin-spin relaxation (lateral relaxation) means the process of changing from the coherent state to the random state. The signal of the lateral relaxation is detected by a coil installed vertically to an external magnetic field. The exchange of energy is not made by the change from the coherent state to the random state, but the states of disorder are different from one another.

The bound rubber is polymer chains subjected to the influence of molecular motion generated by the interaction between the rubber or/and the thermoplastic elastomer and the reinforcing filler, in that portion where there is a close proximity between the rubber or/and the thermoplastic elastomer and the reinforcing filler, including the interface therebetween.

When the reinforcing filler is mixed with the rubber or/and the thermoplastic elastomer, the bound rubber is formed in that portion which is disposed in close proximity to the rubber or/and the thermoplastic elastomer and the reinforcing filler and includes the interface therebetween. Generally, the molecular-motion performance of the bound rubber is low. In the case of carbon black, the molecular-motion performance of the bound rubber is particularly low. The stronger the interaction, the more effective for the wear resistance. According to the present invention, it has been found that it is possible to improve the wear resistance of the elastomer composition by controlling the T2 relaxation time of the bound rubber and the T2 relaxation time of the rubber or/and the thermoplastic elastomer by adding a very small amount of the reinforcing filler such as the carbon black to the rubber or/and the thermoplastic elastomer.

The reason the T2 relaxation time of the bound rubber is set to not less than 250 µs nor more than 400 µs is as follows: If the T2 relaxation time of the bound rubber is set to less than 250 µs, the restraint on the bound rubber is too high, which does not give a favorable influence on the wear resistance of the elastomer composition. On the other hand, if the T2 relaxation time of the bound rubber is set to more than 400 µs, the interaction is hardly generated and the reinforcing filler is present as a foreign matter, which deteriorates the wear resistance of the elastomer composition and makes it difficult to realize a composition having not less than 400 µs in the T2 relaxation time. It is more favorable that the T2 relaxation time of the bound rubber is set to not less than 300 µs nor more than 400 µs.

When a plurality of reinforcing fillers and a plurality of polymer components (rubber and thermoplastic elastomer) are used, it is favorable that the T2 relaxation time of each of the bound rubbers between the reinforcing fillers and the polymer components is not less than 250 µs nor more than 400 µs. It is essential that the T2 relaxation time of the bound rubber between one main reinforcing filler and one main polymer component is not less than 250 µs nor more than 400 µs.

It is preferable that the JIS-A hardness (hardness measured by method specified in JIS- K6253 (test of durometer type A)) is not less than 20 nor more than 45. The rubber roller having the JIS-A hardness in this range can be used favorably as a roller for feeding paper and films.

If the JIS-A hardness is less than 20, the elastomer composition has a high friction coefficient but has a low wear resistance. On the other hand, if the JIS-A hardness is more than 45, the elastomer composition has a low friction coefficient. Thus the rubber roller composed of the elastomer composition has difficulty in feeding paper or the like.

It is preferable to use EPDM as the rubber or/and the thermoplastic elastomer. By using the EPDM and the carbon black in combination, it is possible to allow the elastomer composition to have a sufficient wear resistance and prevent paper from being stained. Thus the rubber roller has superior durability and a high friction coefficient.

The use of the EPDM as the rubber and/or the thermoplastic elastomer provides the following advantages: The friction coefficient of the EPDM can be easily adjusted in dependence on the amount of the oil-extended rubber. The main chain of the EPDM consists of saturated hydrocarbon and does not have double bonds. Therefore, even though the EPDM is exposed to a high-density ozone atmosphere or irradiated with light for a long time, the molecular main chain is hardly cut. Accordingly, it is possible to enhance weatherability and oxidation resistance of the obtained elastomer composition. As the EPDM, it is possible to use oil-unextended type consisting of a rubber component and oil-extended type containing the rubber component and extended oil.

As the filler, it is possible to use the following reinforcing fillers having the interaction between them and the rubber: silica, calcium carbonate, carbon black, clay, talc, resin, wood meal, and the like. It is preferable to use the carbon black in view of cost, dispersibility, and the wear resistance.

As the carbon black, HAF carbon black and the like can be used. In addition, it is possible to use MAF, FEF, GPF, SRF, SAF, MT, FT carbon black. It is preferable that the particle diameter of the carbon black is not less than 10 µm nor more than 100 µm in view of wear resistance and dispersibility.

As the rubber composing the elastomer composition, it is possible to use ethylene-propylene rubber (EPR), natural rubber (NR), butadiene rubber (BR), styrene butadiene rubber (SBR), isoprene rubber (IR), acrylonitrile-butadiene rubber, butyl rubber (IIR), chloroprene rubber (CR), acrylic rubber (ACM, ANM), urethane rubber (U), and silicone rubber (Si) singly or in combination.

It is optimum that the rubber of the elastomer composition consists of the EPDM. In using other rubbers in combination with the EPDM, the ratio of the EPDM to the other rubbers is favorably not less than 50 parts by weight and more favorably not less than 80 parts by weight. It is possible to use the oil-extended type containing the rubber component and the extended oil.

As the thermoplastic elastomer, it is possible to use polyolefin resins such as polypropylene (PP), polyethylene (PE); nylon resin (PA); and styrene resin. These resins can be used in combination with rubber.

It is preferable to crosslink the elastomer composition with organic peroxides. Since the elastomer composition is crosslinked with the organic peroxide, blooming of sulfur does not occur unlike compositions vulcanized with sulfur. Thus the elastomer composition does not have a decrease in its friction coefficient. Further the elastomer composition crosslinked with the organic peroxide has a low compression set. Thus the rubber roller composed of such an elastomer composition is superior in maintaining accuracy and in durability, can be easily processed and molded, and is equivalent to compositions vulcanized with sulfur in static and dynamic mechanical properties. Further the elastomer composition can be prevented from being subjected to crosslinking inhibition.

To set the T2 relaxation time of the bound rubber to the above-described range, it is preferable to use not less than 2.5 nor more than 15 parts by weight of the reinforcing filler for 100 parts by weight of the rubber or/and the thermoplastic elastomer in dependence on the kind of the rubber and/or the thermoplastic elastomer and that of the reinforcing filler. If less than 2.5 parts by weight of the reinforcing filler is used for 100 parts by weight of the rubber or/and the thermoplastic elastomer, the T2 relaxation time of the bound rubber is liable to be less than 250 µs. On the other hand, if more than 15 parts by weight of the reinforcing filler is used for 100 parts by weight of the rubber or/and the thermoplastic elastomer, the elastomer composition is liable to harden and the friction coefficient thereof is liable to become low. It is favorable to use not less than 0.5 nor more than three parts by weight of the crosslinking agent consisting of the peroxide for 100 parts by weight of the rubber and/or the thermoplastic elastomer.

It is favorable to use not less than three parts by weight nor more than 15 parts by weight of the carbon black for 100 parts by weight of the EPDM. Thereby it is possible to improve the wear resistance of the elastomer composition without increasing the hardness thereof, namely, without lowering the friction coefficient thereof. It is more favorable to use not less than five parts by weight nor more than 10 parts by weight of the carbon black for 100 parts by weight of the EPDM.

If less than three parts by weight of the carbon black is used for 100 parts by weight of the EPDM, it is difficult to improve the wear resistance of the rubber roller sufficiently. On the other hand, if more than 15 parts by weight of the carbon black is used for 100 parts by weight of the EPDM, there is a possibility that the rubber roller stains paper.

In the case of the oil-extended rubber, part by weight of the rubber component indicates the weight of only the rubber component obtained by subtracting the weight of the oil component from that of the oil-extended rubber.

It is favorable to use not less than 0.5 nor more than three parts by weight of the crosslinking agent consisting of the peroxide for 100 parts by weight of the EPDM, although the amount of the crosslinking agent consisting of the peroxide is adjusted appropriately according to the kind thereof. It is more favorable to use not less than 1.0 nor more than 2.0 parts by weight of the crosslinking agent consisting of the peroxide for 100 parts by weight of the EPDM.

If less than 0.5 parts by weight of the crosslinking agent consisting of the peroxide is used for 100 parts by weight of the EPDM, the crosslinking speed and the crosslinking density are low. Consequently the elastomer composition has a low wear resistance. On the other hand, if more than three parts by weight of the crosslinking agent consisting of the peroxide is used for 100 parts by weight of the EPDM, the hardness of the rubber is so high that the elastomer composition has a low friction coefficient.

It is preferable that the T2 relaxation time (spin-spin relaxation) of the bound rubber formed between the rubber and/or the thermoplastic elastomer and the reinforcing filler is more than a T2 relaxation time of a bound rubber of the rubber and/or the thermoplastic elastomer to which the reinforcing filler is not added by not less than 150% nor more than 300%.

If the T2 relaxation time is less than 150%, polymer chains that adversely affect the wear resistance interlock with one another to generate crosslinking points locally dense. If the T2 relaxation time is more than 300%, the rubber is plasticized so much that the wear resistance is adversely affected. In the present invention, the change rate (increase rate) of the T2 relaxation time of the rubber or/and the thermoplastic elastomer is specified before and after the reinforcing filler is added to the EPDM.

The T2 relaxation time of the rubber or/and the thermoplastic elastomer indicates the molecular-motion performance of the polymer component which is the matrix. When the T2 is high, the molecular-motion performance of the polymer component is low: There is a restraint on the polymer component owing to interlocking of polymer chains and nonuniform crosslinking form. On the other hand, when the T2 relaxation time is low, the molecular-motion performance of the polymer component is high and there is no restraint on the polymer component.

More specifically, it is preferable that the T2 relaxation time (spin-spin relaxation) of the EPDM is not less than 900 $\mu$s nor more than 1200 $\mu$s.

It is preferable to use dicumyl peroxide (DCP) as the crosslinking agent because it enhances crosslinking efficiency. In addition, the following peroxides can be used as the crosslinking agent in dependence on molding conditions: 1,3-bis (t-butyl peroxyisopropyl) benzene; 1,4-bis (t-butyl peroxyisopropyl) 3,3,5-trimethylcyclohexane; 2,5-dimetyl-2,5-di-t (butyl peroxy) hexyne; n-bytyl-4,4-bis (t-butyl peroxy) valerate singly or in combination. As necessary, the peroxide may be used in combination with resin crosslinking or sulfur crosslinking.

In addition to the peroxide, a crosslinking assistant may be added to the EPDM. As the crosslinking assistants, it is possible to use triallyl isocyanurate (TAIC), triallyl cyanurate (TAC), trimethylolpropane methacrylate (TMPT), and ethylene glycol dimethacrylate (EDMA), N-N'-m-phenylene-bismaleimide. The crosslinking assistant is capable of improving or adjusting various mechanical properties of the elastomer composition such as fatigue characteristics and improving crosslinking density.

The compression set of the elastomer composition measured in accordance with JIS-K 6301 is favorably not more than 40% and more favorably not more than 20%. If the compression set is more than 40%, the dimensional change of the rubber roller composed of the elastomer composition is so large that the rubber roller is inappropriate for practical use and has a problem in the durability and the maintaining accuracy thereof.

It is possible to add favorably not less than 25 nor more than 150 parts by weight of a softener and more favorably not less than 50 nor more than 100 parts by weight thereof for 100 parts by weight of the rubber or/and the thermoplastic elastomer.

As the softener, oil and plasticizer can be used to adjust the hardness of the elastomer composition. As the oil, it is possible to use mineral oils such as paraffin oil, naphthenic oil, aromatic series; and known synthetic oils consisting of oligomer of hydrocarbon series, and process oil. As the synthetic oil, it is possible to use oligomer of $\alpha$-olefin, oligomer of butane, and amorphous oligomer of ethylene and $\alpha$-olefin. As the plasticizer, it is possible to use dioctyl phthalate (DOP), dibutyl phthalate (DBP), dioctyl sebacate (DOS), and dioctyl adipate (DOA).

A filler may be added to the rubber or/and the thermoplastic elastomer as necessary to improve the mechanical strength of the elastomer composition. As the filler, it is possible to use inorganic fillers such as calcium carbonate, magnesium carbonate, and the like; and metal powder, ceramic powder, glass powder, wood meal and the like. It is preferable that the elastomer composition contains not more than 30 parts by weight of the filler for 100 parts by weight thereof. If the elastomer composition contains more than 30 parts by weight of the filler, there is a possibility that the flexibility of the elastomer composition deteriorate. An age resistor may be may be added to the rubber or/and the thermoplastic elastomer.

To allow the elastomer composition to have a higher friction coefficient, it may contain the plasticizer such as the paraffin oil to make the elastomer composition flexible. To allow the elastomer composition to have a higher wear resistance, the elastomer composition may contain a high-molecular weight polymer.

The present invention provides the rubber roller composed of the elastomer composition of the present invention. As described above, the rubber roller is superior in its wear resistance, does not stain paper, and maintains a high friction coefficient. Thus the rubber roller can be suitably used as an elastic roller for feeding paper and films.

The rubber roller of the present invention can be manufactured by known methods. For example, the following components are kneaded by a known rubber-kneading device such as an open roll or a Banbury mixer at 20° C. to 250° C. for one to 20 minutes: the rubber component such as the EPDM, the crosslinking agent, andadditives such as the softener, a compatibilizing agent, the age resistor, and the filler. The crosslinking agent may be added to the kneaded material consisting of these components. Thereafter the kneaded material is press-molded at 140° C. to 230° C. Injection molding can be used by suppressing a crosslinking reaction.

DETAILED DESCRIPTION OF THE PREFERRED EMBODIMENTS

The embodiments of the present invention will be described below with reference to the drawings.

Figure 1:
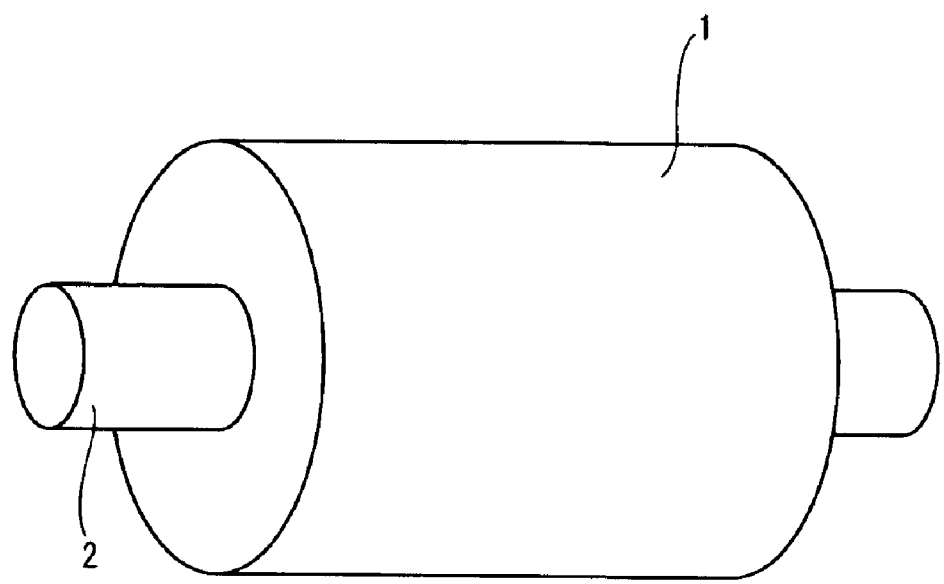
FIG. 1 is a schematic view showing a rubber roller of the present invention.

FIG. 1 shows a cylindrical rubber roller 1 of an embodiment of the present invention. A columnar core (shaft) 2 is inserted into a hollow portion of the rubber roller 1 by press fit. The rubber roller 1 is properly elastic and can be suitably used as a paper-feeding roller or a film-feeding roller of an electrophotographic apparatus.

In the embodiment, EPDM is used as the rubber of an elastomer composition. Carbon black is used as the reinforcing filler. The elastomer composition contains five parts by weight of the carbon black and 1.5 parts by weight of the crosslinking agent consisting of the peroxide for 100 parts by weight of the EPDM. The EPDM is crosslinked with dicumyl peroxide. Thereby the paper-feeding roller 1 is formed of the elastomer composition. The T2 relaxation time of the bound rubber formed between the rubber or/and the thermoplastic elastomer and the reinforcing filler is set to 350 $\mu$s. The bound rubber is polymer chains subjected to the influence of a molecular motion generated by an interaction between the EPDM rubber and the carbon black serving as the reinforcing inorganic filler in the portion that is disposed in close vicinity to the rubber or/and the thermoplastic elastomer and the reinforcing filler and includes the interface therebetween. The bound rubber is formed in the range, of about several tens of angstroms, including the interface between the EPDM and the carbon black.

As the rubber, oil-extended EPDM and oil-unextended EPDM are used in combination. 50 parts by weight of oil is used for 100 parts by weight of the rubber. The T2 relaxation time of the EPDM in the entire elastomer composition is 1100 $\mu$s. The JIS-A hardness of the rubber roller 1 is 37. The compression set of the rubber roller 1 is 9%.

In the rubber roller 1, the T2 relaxation time of the bound rubber formed between the EPDM and the reinforcing filler is set to not less than 250 $\mu$s nor more than 400 $\mu$s. Thus the rubber roller 1 is excellent in its wear resistance and does not stain paper. Further since the rubber roller 1 is composed of the composition crosslinked with the organic peroxide, blooming of sulfur does not occur. Further since the rubber roller 1 contains a small amount of the carbon black and hence does not have a high hardness, the friction coefficient of the rubber roller 1 does not decrease because no blooming occurs. Thereby even though the rubber roller 1 is used repeatedly for a long time, the reduction of the friction coefficient of the rubber roller is suppressed. Further since it has a small amount of wear, the rubber roller 1 is capable of maintaining reliable paper-feeding performance for a long time.

It is possible to use other rubbers in addition to the EPDM, thermoplastic elastomers such as polyolefin resins such as polypropylene (PP), polyethylene (PE), and the like; nylon resins (PA); and styrene resins. In addition to the carbon black, it is possible to use other reinforcing fillers such as clay, talc, resin, wood meal, and the like.

The examples of the present invention and comparison examples will be described in detail below.

The paper-feeding rubber roller of each of the examples 1 to 3 and the comparison examples 1 to 3 were prepared as follows: Components were used at mixing ratios shown in table 1 and kneaded by a known rubber-kneading device such as an open roll or a Banbury mixer at 20° C. to 250° C. for one to 20 minutes. Thereafter the kneaded components were press-molded at 140° C. to 230° C. to prepare a cylindrical body having an inner diameter of $\phi$ 9 mm, an outer diameter of $\phi$ 21 mm, and a length of 38 mm. Thereafter the cylindrical body was polished by a cylindrical grinder to reduce the outer diameter from $\phi$ 21 mm to $\phi$ 20 mm. The length thereof was cut to 10 mm. A core was inserted into the cylindrical body to prepare the paper-feeding rubber roller of each of the examples 1 to 3 and the comparison examples 1 to 3. The rubber rollers were used for measurement and observation described below.

TABLE 1

| | Chemicals | | Maker | CE1 | CE2 | E1 | E2 | E3 | CE3 |
|---|---|---|---|---|---|---|---|---|---|
| Rubber 1 | Esprene 670F | 100 parts by weight of oil-extended EPDM | Sumitomo Kagaku Kogyo Kabushiki Kaisha | 100.0 | 100.0 | 100.0 | 100.0 | 100.0 | 100.0 |
| Rubber 2 | Esprene 586 | oil-unextended EPDM | Sumitomo Kagaku Kogyo Kabushiki Kaisha | 50.0 | 50.0 | 50.0 | 50.0 | 50.0 | 50.0 |
| Rubber 3 | | | | — | — | — | — | — | |
| Rubber 4 | | | | — | — | — | — | — | |
| Reinforcing agent | Carbon black | Sheast 3 (HAF) | Tokai Carbon Kabushiki Kaisha | 0.0 | 2.5 | 5.0 | 7.5 | 15.0 | 30.0 |
| Crosslinking agent | Percumyl D | Dicumyl peroxide | Nippon Yushi Kabushiki Kaisha | 1.5 | 1.5 | 1.5 | 1.5 | 1.5 | 1.5 |
| T2 relation time ($\mu$s) (bound rubber) | | | | — | 240 | 350 | 270 | 255 | 220 |
| T2 relation time ($\mu$s) (polymer component (EPOM)) | | | | 450 | 850 | 1100 | 1000 | 900 | 850 |
| Hardness (JIS A) | | | | 36 | 37 | 37 | 37 | 38 | 50 |

TABLE 1-continued

|  | | | | | | |
|---|---|---|---|---|---|---|
| Compression 70° C. × 24 h set (%) | 8 | 8 | 9 | 10 | 12 | 15 |
| Initial friction coefficient μ | 1.52 | 1.78 | 1.76 | 1.71 | 1.51 | 1.41 |
| Friction coefficient μ after supply of 30K sheets of paper | 1.41 | 1.59 | 1.70 | 1.62 | 1.59 | 1.36 |
| Abrasive loss (mg) after supply of 30K sheets of paper | 73.4 | 58.3 | 35.0 | 42.5 | 48.3 | 42.1 |
| Stain on paper during supply of paper | ○ | ○ | ○ | ○ | ○ | X | where CE denotes Comparison example and where E denotes example.

The mixing amount of the components of table 1 is shown by parts by weight. In table 1, the rubber 1 (Esprene 670F) is an oil-extended rubber containing 50 parts by weight of oil and 50 parts by weight of rubber.

The following measurement and evaluation were conducted on the rubber roller of each of the examples 1 to 3 and the comparison examples 1 to 3. Table 1 shows the results.

Measurement of friction coefficient of rubber roller and abrasion loss after 30000 sheets of paper are supplied thereto A paper supply test was conducted on each rubber roller mounted on a copying apparatus. In the paper supply test, it took 7.5 hours to finish supply of 30000 sheets of paper (PPC paper manufactured by Fuji Xerox Office Supply Kabushiki Kaisha) of size A4 to each rubber roller. As the test conditions, temperature was set to 22° C. and humidity was set to 55%. The abrasive loss (mg) was found by measuring the weight of each rubber roller before and after the test was conducted.

Figure 2:
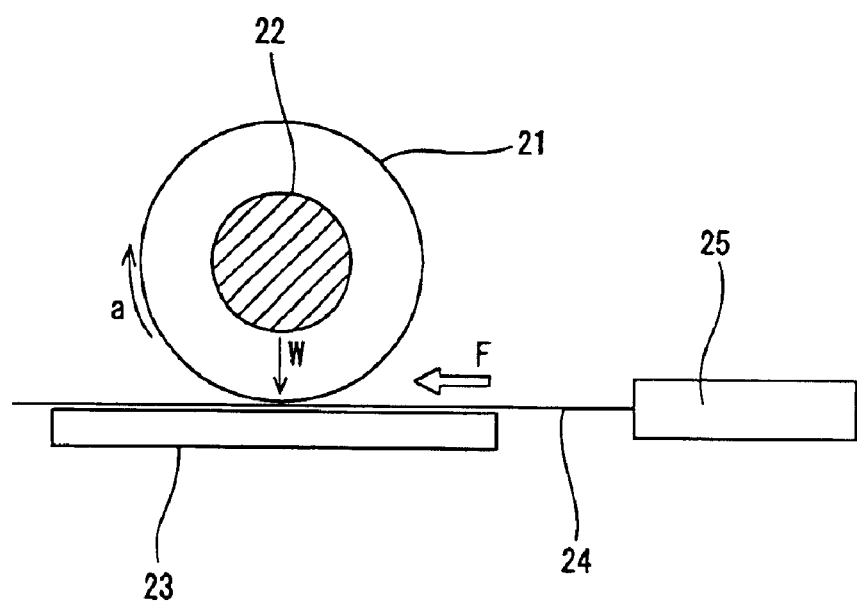
FIG. 2 shows a method of measuring the friction coefficient of the rubber roller.

In the paper supply test, the friction coefficient was measured by the following method shown in FIG. 2: a rubber roller 21 was pressed against a plate 23 by applying a vertical load W (W=250 g) to a rotation shaft 22 of the rubber roller 21 as shown with a black arrow with the PPC paper, connected with a load cell, sandwiched between the rubber roller 21 and the plate 23. The rubber roller 21 was rotated at a peripheral speed of 300/second in the direction shown with an arrow (a) at a temperature of 22° C. and a humidity of 55%. A force F(g) of feeding the paper 23 generated in the direction shown with the white arrow was measured before and after the supply of the paper to the rubber roller 21. The friction coefficient μ was found before and after the supply of the paper to the rubber roller 21 from the measured force F(g) and the load W(250 g) and by using an equation 1 shown below.

The friction coefficient not less than 1.5 was excellent. The abrasive loss not more than 50 mg was excellent.

$$\mu = F(g)/W(g)$$

Hardness

JIS-A hardness (JIS K-6253 (tester durometer type A) spring-type measuring method) was measured.

Compression Set

In accordance with JIS-K6301, the compression set was measured at 70° C. for 24 hours.

T2 Relaxation Time

Using a nuclear magnetic resonator (pulse-NMR) (manufactured by JEOL Inc. JNM-MU25), the T2 relaxation time was measured by solid echo method. In the nuclear magnetic resonator, the resonance frequency was 25 MHz, the resonance magnetic field was 0.5872T, and a nuclear to be measured had 1H. π/pulse width was about 2 μs and the dead time was about 10 μs.

The solid echo method is used to measure T2 of the elastomer composition in a solid state. A plurality of T2 is present in a heterogeneous system. A macroscopic magnetization M(t) is given by an equation shown below:

$$M(t) = \Sigma ai \times exp[-(t/Tai)^{mi}]$$

Fi=ai/Σai (ratio among components)

Mi: Weibull coefficient

Weibull coefficient mi is divided into 1=Lorentz type and 2=Gauss type. Fi indicates volume fraction of each component. In the nuclear magnetic resonator, the plot of a solid echo signal is displayed on its display and printed by a printer. The plot of each component and a calculated value of T2I and fi are displayed on the display and printed by the printer. T2 in the specification corresponds to the T2i.

Stain on paper during feeding of paper

As shown in the column of "stain during supply of paper" of table 1, the mark of "x" was given to the rubber roller that stained the paper, which was observed with the naked eye during the supply of 30000 sheets, whereas the mark of ○ was given to the rubber roller that did not stain the paper, which was not observed with the naked eye during the supply of 30000 sheets.

As shown in table 1, in the rubber rollers of the examples 1 to 3, the T2 relaxation time of the bound rubber formed between the EPDM and the carbon black was in the range of 255 μs to 350 μs which falls in the specified range. Therefore the rubber rollers were superior in the wear resistance thereof and preferable in the friction coefficients thereof because they contained an appropriate amount of the carbon black. Since each of the rubber rollers contained the carbon black in the specified range, they did not stain the paper.

More specifically, the rubber roller of each of the examples 1 to 3 contained 5 to 15 parts by weight of the carbon black for 100 parts by weight (rubber component excluding oil) of the EPDM. Each rubber roller contained 1.5 parts by weight of a crosslinking agent consisting of a peroxide for 100 parts by weight of the EPDM. The T2 relaxation time of the bound rubber formed between the EPDM and the reinforcing filler was set to 900 μs to 1100 μs. That is, the T2 relaxation time (spin-spin relaxation) of the bound rubber formed between the EPDM and the carbon black was more than a T2 relaxation time of a bound rubber of the EPDM to which the carbon black was not added by 244% in the example 1, 222% in the example 2, and 200% in the example 3.

The rubber roller of each of the examples 1 to 3 had an initial friction coefficient of 1.51 to 1.76 which were over 1.5 and thus preferable. After 30K sheets of paper were fed to the rubber rollers, the friction coefficient of each rubber roller was 1.59 to 1.70 which were over 1.5 and thus preferable. After 30K sheets of paper was fed to the rubber rollers, the abrasion losses thereof were in the range of 35 mg to 48.3 mg. Thus they were excellent in the wear resistance thereof. They had JIS-A hardness of 37–38 that were appropriate. The compression set was in the range of 9 to 12% which were appropriate. In addition, they did not stain paper.

Accordingly it was confirmed that the rubber rollers of the examples 1 to 3 were all superior in paper-feeding performance. Further since the rubber rollers were crosslinked with the organic peroxide, blooming of sulfur did not occur. Therefore it was possible to suppress blooming-caused reduction of the friction coefficient.

On the other hand, since the rubber roller of the comparison example 1 did not contain the carbon black, the bound rubber was not present. Thus the T2 relaxation time could not be measured. The abrasion loss of the rubber roller was as large as 73.4 mg. That is, the rubber roller was inferior in its wear resistance. The friction coefficient of the rubber roller was smaller than 1.5 after 30,000 sheets of paper was fed thereto.

The T2 relaxation time of the bound rubber in the rubber roller of the comparison example 2 was 240 $\mu$s smaller than those of the rubber rollers of the examples 1 to 3. Since the amount of the carbon black contained in the rubber roller was smaller than the specified range, the friction coefficient thereof was more than 1.5 which was larger than that of the comparison example 1. However, the abrasion loss of the rubber roller was 58.3, which indicates that the wear resistance was low.

The T2 relaxation time of the bound rubber in the rubber roller of the comparison example 3 was 220 $\mu$s smaller than that of the comparison example 2. Since the amount of the carbon black contained in the rubber roller was much larger than the specified range, the initial friction coefficient thereof and the friction coefficient after 30000 sheets of paper were supplied thereto were less than 1.5. The hardness of the rubber roller was 50 which was larger than the other rubber rollers. Further the rubber roller stained paper.

As apparent from the foregoing description, according to the present invention, the T2 relaxation time of the bound rubber formed between the rubber or/and the thermoplastic elastomer and the reinforcing filler is specified in the above-described range. Therefore the elastomer composition is excellent in its wear resistance and thus has a small amount of wear in a long-time use and a high durability. Further it is possible to suppress reduction of the friction coefficient thereof.

The T2 relaxation time (spin-spin relaxation) of the bound rubber formed between the rubber or/and the thermoplastic elastomer and the reinforcing filler is more than a T2 relaxation time of a bound rubber of the rubber or/and the thermoplastic elastomer to which the reinforcing filler is not added by not less than 150% nor more than 300%. Therefore the elastomer composition has improved wear resistance.

Accordingly the rubber roller of the present invention is reliable in its paper supply performance and paper-feeding performance for a long time. Thus it is possible to save time and labor in repair and maintenance. Therefore the rubber roller of the present invention can be suitably used as the paper-feeding roller of the paper-feeding mechanism of office appliances such as a laser printer, an electrostatic copying apparatus, a facsimile apparatus; and an automatic deposit payment machine (ATM). The rubber roller of the present invention is particularly suitable as the paper-feeding roller of an inject printer and a copying apparatus.

What is claimed is:

1. An elastomer composition which comprises a rubber and/or a thermoplastic elastomer as a main component thereof and carbon black as a reinforcing filler dispersed in said rubber and/or said thermoplastic elastomer, said carbon black being present in an amount of not less than three nor more than fifteen parts by weight per 100 parts by weight of said rubber and/or thermoplastic elastomer,
    wherein a T2 relaxation time (spin-spin relaxation) of a bound rubber formed in that a portion which is disposed in close proximity to said rubber or/and said thermoplastic elastomer and said reinforcing filler and includes an interface therebetween is set to not less than 250 $\mu$s nor more than 400 $\mu$s.

2. The elastomer composition according to claim 1, wherein said bound rubber is polymer chains subjected to influence of a molecular motion generated by an interaction between said rubber or/and said thermoplastic elastomer and said reinforcing filler in said portion that is disposed in close proximity to said rubber or/and said thermoplastic elastomer and said reinforcing filler and includes said interface therebetween.

3. The elastomer composition according to claim 1, wherein a JIS-A hardness is not less than 20 nor more than 45.

4. The elastomer composition according to claim 2, wherein a JIS-A hardness is not less than 20 nor more than 45.

5. The elastomer composition according to claim 1, wherein EPDM is used as said rubber and/or said thermoplastic elastomer.

6. The elastomer composition according to claim 2, wherein EPDM is used as said rubber and/or said thermoplastic elastomer.

7. The elastomer composition, according to claim 1, which is crosslinked with an organic peroxide.

8. The elastomer composition, according to claim 2, which is crosslinked with an organic peroxide.

9. The elastomer composition according to claim 5, wherein not less than 0.5 nor more than three parts by weight of a peroxide crosslinking agent are used for 100 parts by weight of said EPDM.

10. The elastomer composition according to claim 7, wherein not less than 0.5 nor more than three parts by weight of the organic a peroxide crosslinking agent are used for 100 parts by weight of said rubber and/or thermoplastic elastomer.

11. The elastomer composition according to claim 1, wherein said T2 relaxation time (spin-spin relaxation) of said bound rubber formed between said rubber and/or said thermoplastic elastomer and said reinforcing filler is more than a T2 relaxation time of the bound rubber of said rubber and/or said thermoplastic elastomer to which said reinforcing filler is not added by not less than 150% nor more than 300%.

12. The elastomer composition according to claim 2, wherein said T2 relaxation time (spin-spin relaxation) of said bound rubber formed between said rubber and/or said thermoplastic elastomer and said reinforcing filler is more than a T2 relaxation time of the bound rubber of said rubber and/or said thermoplastic elastomer to which said reinforcing filler is not added by not less than 150% nor more than 300%.

13. A rubber roller formed from the elastomer composition according to claim 1.

14. A rubber roller formed from the elastomer composition according to claim 2.

15. The rubber roller, according to claim 13, which is used as a paper-feeding roller or a film-feeding roller.

* * * * *